United States Patent
Bolic et al.

(10) Patent No.: US 10,474,852 B2
(45) Date of Patent: Nov. 12, 2019

(54) CHARGING LONG-RANGE RADIO FREQUENCY IDENTIFICATION TAGS

(71) Applicant: Teslonix Inc., Ottawa (CA)

(72) Inventors: Miodrag Bolic, Ottawa (CA); James Stuart Wight, Ottawa (CA); Rony Everildo Amaya, Kanata (CA); Cezary Paul Slaby, Ottawa (CA)

(73) Assignee: Teslonix Inc., Ottawa (CA)

( * ) Notice: Subject to any disclaimer, the term of this patent is extended or adjusted under 35 U.S.C. 154(b) by 500 days.

(21) Appl. No.: 15/398,641

(22) Filed: Jan. 4, 2017

(65) Prior Publication Data
US 2017/0116443 A1    Apr. 27, 2017

Related U.S. Application Data

(63) Continuation-in-part of application No. 14/923,847, filed on Oct. 27, 2015.
(Continued)

(51) Int. Cl.
*G06K 7/10* (2006.01)
*H02J 7/02* (2016.01)
(Continued)

(52) U.S. Cl.
CPC .......... *G06K 7/10158* (2013.01); *H02J 7/025* (2013.01); *H02J 50/20* (2016.02);
(Continued)

(58) Field of Classification Search
CPC .......... G06K 19/0705; G06K 19/0723; G06K 19/0707; G06K 19/0712; G06K 7/00; G06K 7/10207; H02J 50/40
See application file for complete search history.

(56) References Cited

U.S. PATENT DOCUMENTS

| 3,510,788 A | 5/1970 | Wollesen |
| 3,534,294 A | 10/1970 | Auer |

(Continued)

FOREIGN PATENT DOCUMENTS

| JP | 2011199975 A | 10/2011 |
| WO | 2007084716 A3 | 12/2007 |
| WO | 2014102828 A2 | 7/2014 |

OTHER PUBLICATIONS

EPO Office Action for Application No. 15 855 996.3, dated Nov. 26, 2018; 5 pages.
(Continued)

*Primary Examiner* — Mirza F Alam
(74) *Attorney, Agent, or Firm* — Atesa Legal PLLC

(57) ABSTRACT

A system for charging long-range radio frequency identification tags includes a plurality of physically separated transmitters. Each transmitter is configured to direct a respective energy beam to an energy location. A tag is at the energy location. The tag is configured to store a received energy from the energy location, to sense a sensor data and to transmit the sensor data to a reader after a capacitor connected to the tag charges to an operating voltage level. The capacitor is charged by the received energy. A controller is configured to align at the energy location for each of the plurality of transmitters, a respective frequency, and at least one of a respective phase, and a respective polarity of each respective energy beam to maximize an energy level at the energy location in response to a device response of the tag.

17 Claims, 11 Drawing Sheets

Second Embodiment

Related U.S. Application Data

(60) Provisional application No. 62/136,142, filed on Mar. 20, 2015, provisional application No. 62/073,448, filed on Oct. 31, 2014, provisional application No. 62/085,450, filed on Nov. 28, 2014, provisional application No. 62/129,325, filed on Mar. 6, 2015, provisional application No. 62/276,285, filed on Jan. 8, 2016.

(51) Int. Cl.
    *H02J 50/20*    (2016.01)
    *H02J 50/40*    (2016.01)
    *H02J 50/90*    (2016.01)
    *H02J 7/34*    (2006.01)

(52) U.S. Cl.
    CPC .............. *H02J 50/40* (2016.02); *H02J 50/90* (2016.02); *H02J 7/345* (2013.01)

(56) References Cited

U.S. PATENT DOCUMENTS

| | | | |
|---|---|---|---|
| 4,103,260 A | 7/1978 | Buchman | |
| 4,241,316 A | 12/1980 | Knapp | |
| 4,348,676 A | 9/1982 | Tom | |
| 4,496,909 A | 1/1985 | Knapp | |
| 4,503,403 A | 3/1985 | Taylor et al. | |
| 4,710,977 A | 12/1987 | Lemelson | |
| 5,218,366 A | 6/1993 | Cardamone et al. | |
| 5,400,036 A | 3/1995 | Kochiyama et al. | |
| 5,883,829 A | 3/1999 | Wagt | |
| 6,184,696 B1 | 2/2001 | White et al. | |
| 6,798,716 B1 | 9/2004 | Charych | |
| 6,882,227 B2 | 4/2005 | Barry et al. | |
| 6,967,462 B1 | 11/2005 | Landis | |
| 7,068,991 B2* | 6/2006 | Parise .................. | B01F 5/0614 455/343.1 |
| 7,482,273 B1 | 1/2009 | Klein et al. | |
| 7,566,889 B1 | 7/2009 | Klein et al. | |
| 7,626,134 B1 | 12/2009 | Klein et al. | |
| 7,711,441 B2 | 5/2010 | Tillotson | |
| 8,232,748 B2 | 7/2012 | Treas et al. | |
| 8,258,882 B2 | 9/2012 | Shibasaki et al. | |
| 8,384,314 B2 | 2/2013 | Treas et al. | |
| 8,760,743 B2 | 6/2014 | Lal et al. | |
| 8,948,847 B2 | 2/2015 | Afsar et al. | |
| 9,124,125 B2 | 9/2015 | Leabman et al. | |
| 9,384,376 B2 | 7/2016 | Sabesan et al. | |
| 9,787,103 B1* | 10/2017 | Leabman ................ | H04W 4/80 |
| 2006/0001509 A1 | 1/2006 | Gibbs | |
| 2006/0108421 A1* | 5/2006 | Becker ............... | G06K 19/0705 235/451 |
| 2008/0068174 A1* | 3/2008 | Al-Mahdawi ........ | H04B 5/0062 340/572.7 |
| 2008/0231449 A1* | 9/2008 | Moshfeghi ............. | G01D 21/00 340/572.1 |
| 2008/0275572 A1 | 11/2008 | Tillotson | |
| 2009/0315412 A1 | 12/2009 | Yamamoto et al. | |
| 2010/0188027 A1 | 7/2010 | Treas et al. | |
| 2010/0315045 A1 | 12/2010 | Zeine | |
| 2011/0080267 A1 | 4/2011 | Clare et al. | |
| 2012/0162010 A1 | 6/2012 | Georgiadis et al. | |
| 2012/0313577 A1 | 12/2012 | Moes et al. | |
| 2013/0016814 A1 | 1/2013 | Treas et al. | |
| 2013/0137455 A1 | 5/2013 | Xia et al. | |
| 2013/0303901 A1 | 11/2013 | Afsar et al. | |
| 2014/0043487 A1 | 2/2014 | Marandos et al. | |
| 2014/0078568 A1 | 3/2014 | Lal et al. | |
| 2014/0080264 A1 | 3/2014 | Chan et al. | |
| 2014/0138432 A1 | 5/2014 | Park et al. | |
| 2014/0175893 A1 | 6/2014 | Sengupta et al. | |
| 2014/0266480 A1 | 9/2014 | Li et al. | |
| 2014/0354064 A1 | 12/2014 | Tseliakhovich | |
| 2015/0022009 A1 | 1/2015 | Leabman et al. | |
| 2015/0318730 A1 | 11/2015 | Bhargava et al. | |
| 2015/0340875 A1 | 11/2015 | Prasad | |
| 2016/0042206 A1* | 2/2016 | Pesavento ............ | H01Q 1/2216 235/385 |
| 2017/0149294 A1 | 5/2017 | Wight et al. | |
| 2019/0181691 A1 | 6/2019 | Wight et al. | |

OTHER PUBLICATIONS

GS1 EPCGLOBAL Inc., "EPC Radio-Frequency Identity Protocols Generation-2 UHF RFID," Specification for RFID Air Interface Protocol for Communications at 860 Mhz-960 Mhz, Version 2.0.1 Ratified; 152 pages.

Non-Final Office Action dated Feb. 19, 2019 for U.S. Appl. No. 14/923,847, 17 pages.

Final Office Action for U.S. Appl. No. 14/923,847, dated Nov. 8, 2018; 21 pages.

Notice of Allowance for U.S. Appl. No. 15/424,752, dated Nov. 16, 2018; 10 pages.

PCT International Search Report and Written Opinion for PCT/IB2017/000162, dated Jun. 16, 2017; 8 pages.

PCT International Search Report and Written Opinion for PCT/IB2017/000174, dated Jun. 9, 2017; 10 pages.

Non-Final Office Action dated May 11, 2018 for U.S. Appl. No. 14/923,847, 16 pages.

Wight et al., "A Microstrip and Stripline Crossover Structure," IEEE Transactions on Microwave Theory and Techniques, May 1976; 1 page.

Korean Non-Final Office Action for 10-2017-7011095, dated Jun. 8, 2018; 8 pages.

European Patent Office Search Report for 15855996.3, nationalized from PCT/IB2015002192, dated Feb. 13, 2018; 10 pages.

Notice of Allowance for U.S. Appl. No. 14/923,847, dated Jun. 25, 2019, revised Aug. 5, 2019; 7 pages.

Jing Feng et al, "Energy-efficient transmission for beamforming in wireless sensor networks," Sensor Mesh and Ad Hoc Communications and Networks (SECON), 2010 7th Annual IEEE Communications Society Conference on. IEEE, 2010; 9 pages.

PCT International Search Report and Written Opinion for PCT/IB2015/002192, dated Jan. 21, 2016; 8 pages.

Stefan Berger et al., "Carrier Phase Synchronization of Multiple Distributed Nodes in a Wireless Network," Signal Processing Advances in Wireless Communications, 2007, SPAWC 2007, IEEE 8th Workshop on. IEEE 2007; 5 pages.

\* cited by examiner

Operating Modes of Transmitters and RFID Readers

Operating Modes of Tags

First Embodiment

First Embodiment

Second Embodiment

Second Embodiment

Third Embodiment

Fourth Embodiment

Fourth Embodiment

CHARGING LONG-RANGE RADIO FREQUENCY IDENTIFICATION TAGS

CROSS-REFERENCE TO RELATED APPLICATIONS

This application is a utility application claiming priority to U.S. Provisional Application Ser. No. 62/276,285 filed on Jan. 8, 2016 entitled "CHARGING BATTERY-LESS LONG-RANGE RFID TAGS," and to co-pending U.S. patent application Ser. No. 14/923,847, filed on Oct. 27, 2015, entitled, "WIRELESS ENERGY TRANSFER USING ALIGNMENT OF ELECTROMAGNETIC WAVES," which claims priority to U.S. Provisional Application Ser. No. 62/073,448 filed on Oct. 31, 2014 entitled "DISTANCE WIRELESS CHARGING USING CHARGING STATIONS," U.S. Provisional Application Ser. No. 62/085,450 filed on Nov. 28, 2014 entitled "WIRELESS POWER TRANSFER AS APPLIED TO SOLAR PANELS," U.S. Provisional Application Ser. No. 62/129,325 filed on Mar. 6, 2015 entitled "WIRELESS POWER TRANSFER USING ELECTROMAGNETIC WAVES ALIGNMENT," and U.S. Provisional Application Ser. No. 62/136,142 filed on Mar. 20, 2015 entitled "WIRELESS POWER TRANSMISSION," the entireties of which are incorporated by reference herein.

FIELD

This disclosure relates generally to wireless energy transfer for radio frequency identification (RFID) tags, and more specifically to extending the charging range of RFID tags.

BACKGROUND

Radio frequency identification (RFID) tags are used in a variety of different environments, including identification of goods in a warehouse as well as for environmental sensing. The energy storage capability of a tag limits a reading range between the tag and a reader. As the processing capability of tags increases, the consumption of the limited stored energy also increases, thereby further limiting the reading range. Furthermore, the transmission medium between the tag and the reader can limit the range. For example, a tag embedded in an automobile to facilitate manufacturing, or a tag embedded in an article of clothing, will include material between the tag and the reader other than free-space air.

Typically, a tag stores energy with a battery, which increases the cost and size of the tag. Alternatively, near-field techniques have been used, however such techniques are limited to short distances (e.g. on the order of centimeters) and rely on inductive or capacitive coupling. RFID tags require an efficient way of being powered over a long distance in an environment without tethering, without using dangerously high levels of power, or imposing undue restrictions on the placement of charging stations used to power the RFID tags.

BRIEF SUMMARY

As will be appreciated, embodiments as disclosed herein include at least the following. In one embodiment a system for charging long-range radio frequency identification tags comprises a first transmitter configured to direct a first energy beam to an energy location. A second transmitter is configured to direct a second energy beam to the energy location. The second transmitter is physically separate from the first transmitter. A tag is at the energy location. The tag is configured to store a received energy from the energy location, to sense a sensor data, and to transmit the sensor data to a reader after a period from when the tag is at the energy location. A controller is configured to align at the energy location, a first frequency of the first energy beam with a second frequency of the second energy beam, and at least one of a first phase, and a first polarity of the first energy beam with a respective second phase, and a respective second polarity of the second energy beam to maximize an energy level at the energy location in response to a device response of the tag.

Alternative embodiments of the system for charging long-range radio frequency identification tags include one of the following features, or any combination thereof. The reader is integrated with the first transmitter to direct the first energy beam and receive the sensor data with an antenna of the first transmitter. The reader is integrated with the first transmitter to direct the first energy beam and receive the sensor data with a first antenna of the first transmitter, and a second reader is integrated with the second transmitter to direct the second energy beam and receive the sensor data with a second antenna of the second transmitter. The device response is one of a received signal strength indicator and a magnitude of the received energy at the tag communicated from the tag using backscatter. The tag further comprises a capacitor configured to be charged to an operating voltage level in response to the tag receiving the received energy, wherein the period equals a charging time to charge the capacitor to the operating voltage level measured by a voltage monitor connected to the capacitor. The tag is configured to transmit a default content of a memory of the tag, while the capacitor is not charged to the operating voltage level, and the tag is configured to sense and transmit the sensor data after the capacitor is charged to the operating voltage level. The default content of the memory includes one of a cleared data value representing a cleared condition of the memory, a semaphore representing an uncharged status of the capacitor, a semaphore representing whether the sensor data has been sensed since last transmitted, a timestamp value representing a time when the memory was cleared, and a received signal strength indicator representing a signal strength of the received energy. The tag is configured to sense the sensor data, save the sensor data in a memory of the tag and set a semaphore after saving the sensor data, in response to the tag receiving the received energy, and to transmit the sensor data to the reader only if the semaphore is set and queried by the reader, wherein the period equals a sensing time for the tag to set the semaphore after the tag is at the energy location. The period is a fixed duration of time. The energy location is moved to a new energy location after the period, and the energy location is determined, at least in part, from a plurality of reference tags, each reference tag transmitting a respective received signal strength indicator corresponding to a signal strength of the received energy at the respective reference tag. The controller is configured to deactivate at least one of the first transmitter and the second transmitter in response to the controller detecting a background energy having a same frequency as the respective first transmitter or second transmitter.

In another embodiment, a method for charging long-range radio frequency identification identification tags comprises directing by a first transmitter, a first energy beam to an energy location. A second transmitter physically separate from the first transmitter directs a second energy beam to the energy location. A tag stores at the energy location, a received energy from the energy location. A sensor data is sensed with the stored received energy. The sensor data is transmitted with the stored received energy, from the tag to a reader, after a period from when the tag is at the energy location. A controller aligns at the energy location, a first frequency of the first energy beam with a second frequency of the second energy beam, and at least one of a first phase and a first polarity of the first energy beam with a respective second phase and a respective second polarity of the second energy beam to maximize an energy level at the energy location in response to a device response of the tag.

Alternative embodiments of the method for charging long-range radio frequency identification tags include one of the following features, or any combination thereof. The device response of the tag is determined from a received signal strength indicator (RSSI), the RSSI being a measured value of the received energy at the tag. The tag communicates the device response using backscatter, and the device response is based on a magnitude of the received energy at the tag. Storing further comprises charging a capacitor connected to the tag to store the received energy, and further comprises an operating voltage level on the capacitor measured to determine an amount of received energy, wherein the tag transmits a default content of a memory of the tag, while the capacitor is not charged to the operating voltage level, and the tag senses and transmits the sensor data after the capacitor is charged to the operating voltage level. The sensor data is saved after sensing the sensor data, a semaphore is set in response to saving the sensor data, and the saved sensor data is transmitted, only in response to a query by the reader when the semaphore is set. The energy location is determined from a plurality of reference tags transmitting a respective received signal strength indicator corresponding to a signal strength of the received energy at the respective reference tag. At least one of the first transmitter and the second transmitter is deactivated in response to the controller detecting a background energy having a same frequency as the respective first transmitter or second transmitter.

In another embodiment, a system for charging long-range radio frequency identification identification tags comprises a plurality of physically separated transmitters. Each transmitter is configured to direct a respective energy beam to an energy location. A tag at the energy location is configured to store a received energy from the energy location, to sense a sensor data and to transmit the sensor data to a reader after a capacitor connected to the tag charges to an operating voltage level. The capacitor is charged by the received energy. A controller is configured to align at the energy location for each of the plurality of transmitters, a respective frequency, and at least one of a respective phase, and a respective polarity of each respective energy beam to maximize an energy level at the energy location in response to a device response of the tag.

Alternative embodiments of the system for charging long-range radio frequency identification tags include one of the following features, or any combination thereof. The device response is one of a received signal strength indicator and a magnitude of the received energy at the tag communicated from the tag using backscatter.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for long-range charging and communication with RFID tags, thereby extending the reading range and increasing the capability of passive radio frequency identification (RFID) tags. The system contains a subsystem for wireless charging and a subsystem for RFID communication. The examples herein utilize a long range UHF RFID protocol that resembles EPC Class 1 Generation 2 protocol—however the examples can be easily generalized to any reader-talk-first or tag-talk-first protocol.

Figure 1:
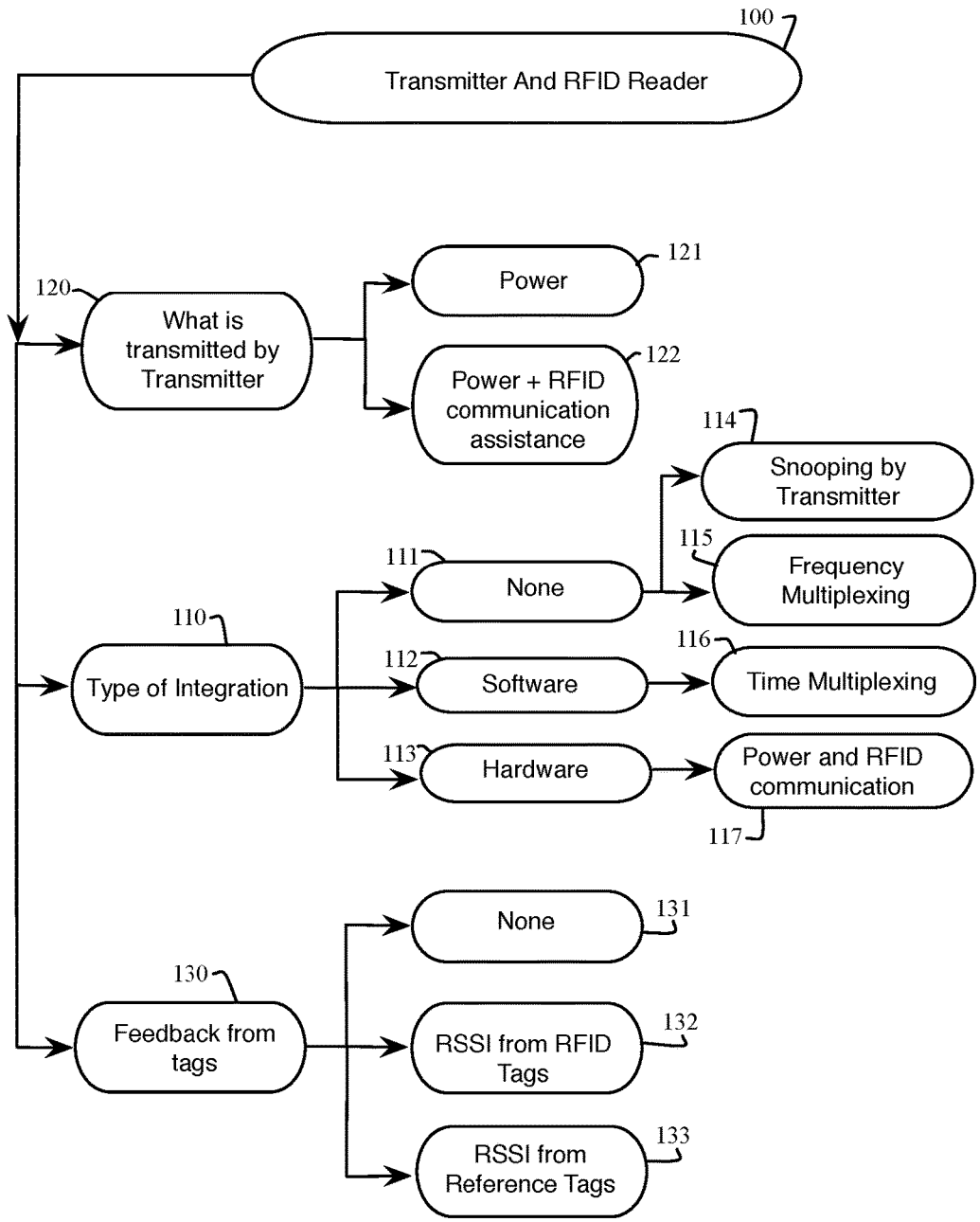
FIG. 1 is a schematic view of various classifications of operating modes of transmitters and RFID readers.
Figure 2:
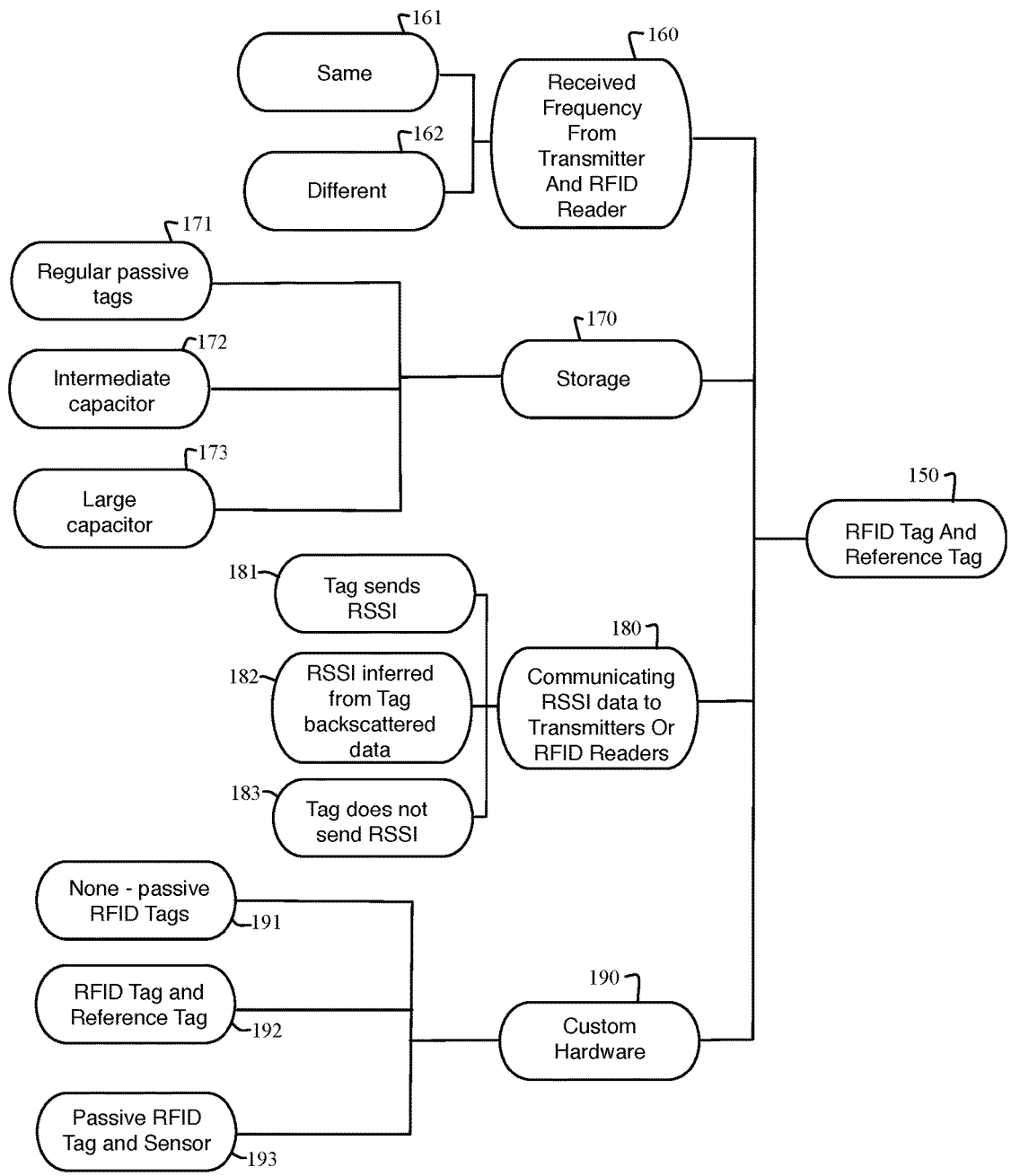
FIG. 2 is a schematic view of various classifications of operating modes of RFID tags and reference tags.

FIG. 1 and FIG. 2 represent example classifications of operating modes for different tag, RFID reader and transmitter implementations. Different embodiments are presented below using combinations of these classifications that result in extended range operation. Referring to FIG. 1, we classify systems based on how transmitters are connected or integrated with RFID readers (110), if the transmitters transmit only power or both power and data (120), and if the decision at the transmitters regarding at least one of its frequency, phase, and polarity is based on the feedback from the RFID tags, from the reference tags or neither (130). In one embodiment, the transmitter's frequency is adjusted locally without the need for RFID tag feedback.

Referring to FIG. 2, on the tag side, we distinguish systems where the tags receive power power from the transmitter and communicate with the RFID reader. In some embodiments, the "transmitter" is also referred to as a Power Access Point (PAP). In one embodiment, the energy received from the transmitter and the communication with the RFID reader operate in the same frequency range (161) and therefore the tag would require only one antenna, or alternatively in different frequency ranges (160). In addition, tags can have different energy storage requirements (170) that vary from very small capacitance (171), such as off-the-shelf passive UHF RFID tags where the energy needs to be constantly provided to the tag in order to operate, to very large capacitance (173), where the energy can be stored for several minutes. Tags can be differentiated based on custom hardware that need to be made in the tag design (190), and whether the tag communicates its RSSI value back to the transmitters or RFID readers (180). Furthermore, the tag can send an RSSI value (181) when the tag, and in the case of a passive or semi-passive tag, an RSSI value is inferred from backscattered data (182).

The example classification of FIG. 1 and FIG. 2 illustrates a multiplicity of possible combinations, considering selecting a transmitter classification (from FIG. 1) and a compatible tag classification (from FIG. 2). Many of the possible combinations are compatible in a single system. For example, a transmitter of a given classification is able to communicate with, or provide power to, a plurality of different classifications of tags (or receivers of transmitted energy). The following embodiments are intended to be illustrative of example use cases and should not be construed to limit the different combined classifications of the transmitters and tags.

First Embodiment

The first embodiment provides a method for extending processing capabilities of the tags by integrating the RFID reader and the transmitters. The transmitters will not only send the power required to energize the tag, using a continuous wave (CW) energy beam but will also send communication data. The range of communication will be extended if either the phase or the polarity of the communication data signals is synchronized (e.g., the phase of two or more transmitters are aligned). The range of communication will be further extended if both the phase and the polarity of the communication data signals are synchronized. In one embodiment, this system can be used to extend processing capabilities of passive sensor tags. In another embodiment, the system can be used to extend the range of off-the-shelf passive tags. Standard RFID protocol or custom protocols can be used to read the tags.

Figure 3:
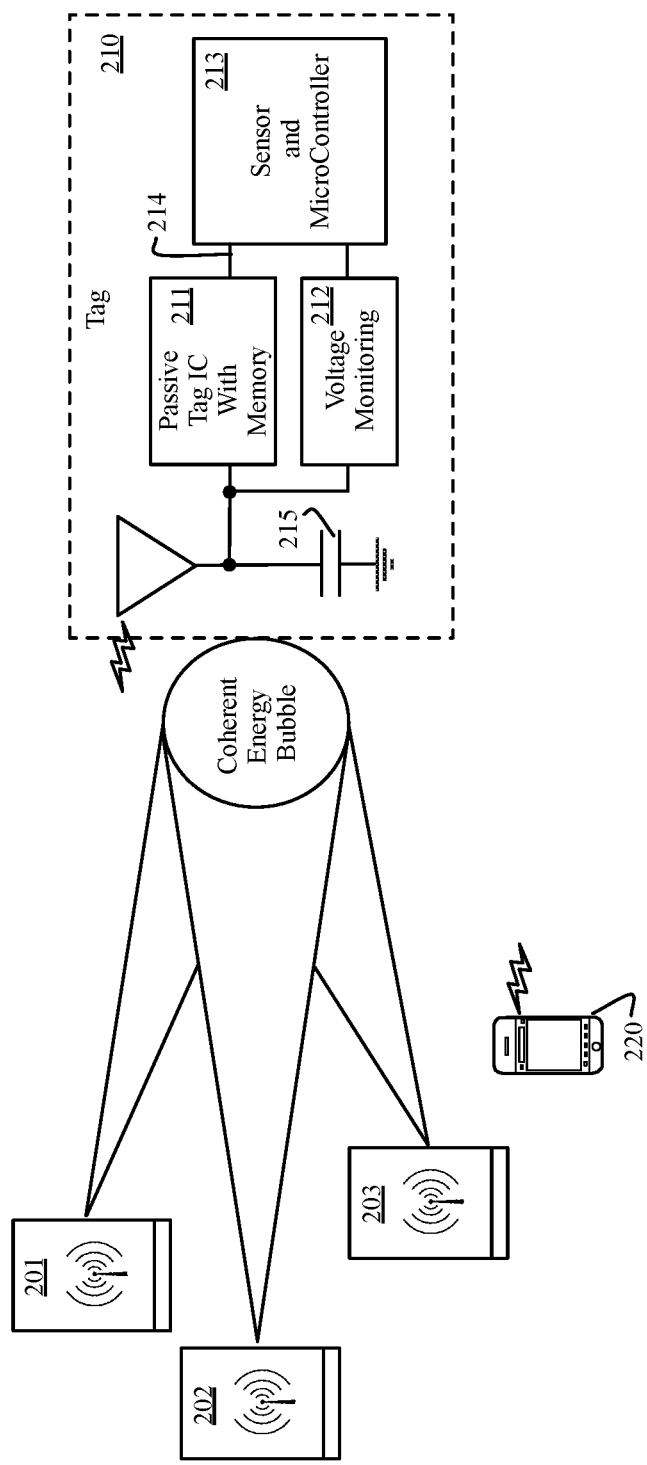
FIG. 3 is a schematic view of a first embodiment of a system with an integrated transmitter and RFID reader.

FIG. 3 presents an embodiment of a system for improving processing capabilities of passive tags with integrated transmitters and an RFID reader. The transmitters are integrated with the RFID reader and therefore this system corresponds to classification 117 in FIG. 1. In addition, the integrated system does not only transmit a continuous wave to power to the tag, but also RFID data and therefore it is related to 122 in FIG. 1. The transmitter and RFID reader systems operate at the same frequency range (161 in FIG. 2). For example, the transmitter transmits power to the tag on the same frequency used by the RFID reader to read the tag. The tag needs to store energy to wake up electronics for sensing (172 or 173 in FIG. 2) and requires custom hardware such as a passive RFID tag and sensor (193). The RFID tag can send the RSSI value if there is custom electronics to acquire RSSI (181) or the tag can just backscatter the tag's received signal and the RSSI can be inferred at the RFID reader (182).

In FIG. 3, the RFID reader and transmitters are integrated. We consider two different implementations. In the first one, only one transmitter, (for example 201) is acting as an RFID reader and is able to transfer RFID commands and receive tag's data. All other transmitters only transmit CW energy at the same frequency as the transmitter/reader 201. In the second implementation, all transmitters act as RFID readers and transmit energy and RFID commands and receive tag's data. In the example of the protocol shown in FIG. 4, we will consider the first implementation. The transmitters are controlled remotely from the computer system 220. The tag 210 contains the antenna and the passive tag IC (211) for communication with the RFID reader. In addition, it consists of a storage element such as capacitor (215), voltage monitoring circuit (212) for turning on the sensor logic when the capacitor 215 is sufficiently charged and a sensor and microcontroller system (213). When sensor data is acquired, it is communicated using a bus (214), such as a serial I2C bus, to the internal memory of the passive tag IC (211).

Figure 4:
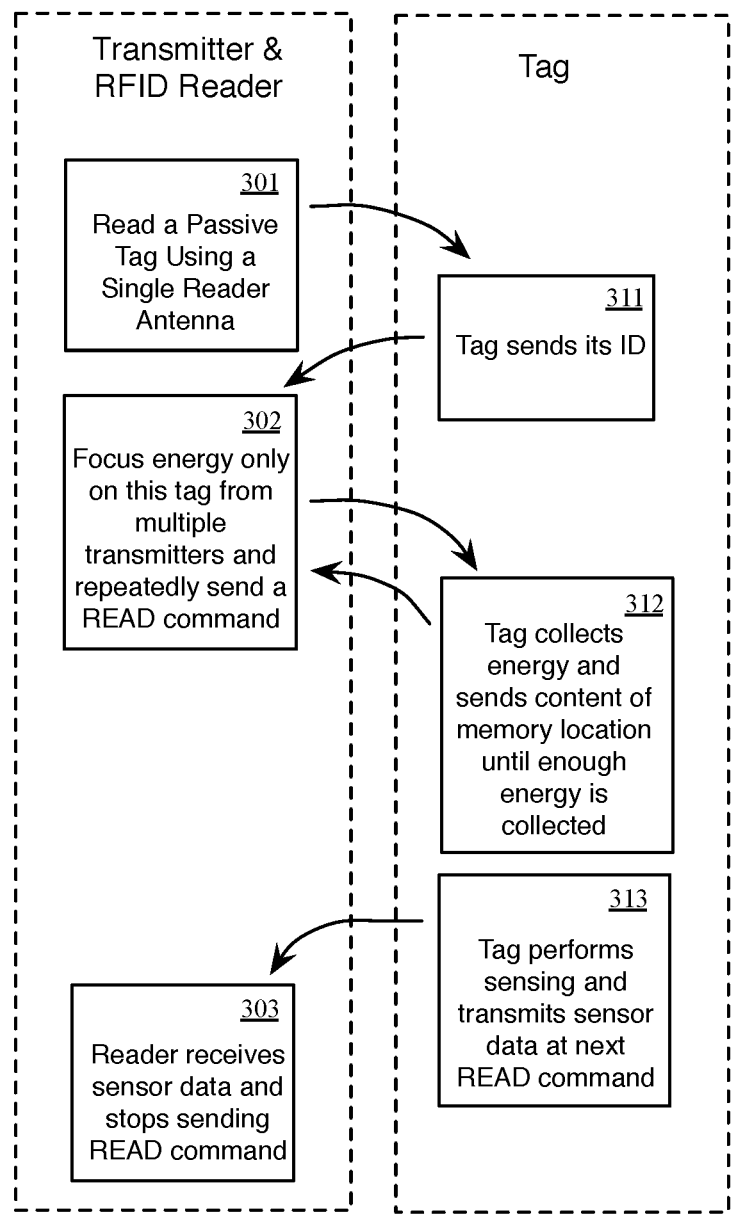
FIG. 4 is a flowchart representation of a method for operating the system shown in FIG. 3.

In this embodiment, the sensor 213 will not be turned on until sufficient charge is collected on the capacitor and therefore the tag will operate as a passive tag and achieve a relative large reading range. Typically, the reading range decreases by making tags more complex, (e.g., adding more electronics). Therefore, in tag 210, the power-hungry electronics (such as 213) will not be turned on until sufficient energy is collected. The additional energy for sensing will be collected by turning on the transmitter to charge the capacitor 215. FIG. 4 shows an implementation of a protocol of a system presented in FIG. 3. We consider the first implementation where only one transmitter is integrated with and/or uses the RFID reader (for example 201). Initially, the reader (201) starts reading tags. There can be multiple tags in the reading range. The reader (201) reads (e.g., singulates) one tag (210) using a standard RFID protocol. After the reader sends a command (301) to the tag, the tag responds with its identification number (ID) (311). After identifying the tag, the reader (201) continues to send additional commands to read the content of the tag's memory. Let's call the command: READ command. During sending of the READ command, other transmitters (202, 203) will be turned on and/or directed to provide additional energy to the tag. The transmitters 202 and 203 are aligned to send CW energy at the same frequency as the transmitter/reader 201. In this embodiment, the tag responds with the content of the same memory location to the READ command (312). The reader/transmitter 201 receives the response from the tag, extracts the RSSI and adjusts the phases of the transmitters and sends another READ command 302. The capacitor at the tag's side will be charged as more energy is provided to the tag. When sufficient energy is provided, the sensor will be turned on and will perform sensing and save sensed data in the memory location. Now, the content of that memory location will be different than before (313). After reading that memory location next time by using the READ command, the reader will read the new value and that would mean that the tag performed sensing (303). In that case, the reader 201 will proceed to read other tags. In various embodiments, the tag's memory will be cleared upon being read. In another embodiment, the tag's memory includes a semaphore to indicate that the memory has been updated or cleared (e.g. set to a reserved value that represents the absence of sensor data). In another embodiment, the tag's memory includes a timestamp of a local clock to indicate the time at which the memory was updated.

Another embodiment includes a tag that can estimate the received RSSI value and send send the RSSI value in response to READ commands, such as in response to read commands prior to sufficient energy having been provided, instead of transmitting the content of the same memory location. This implementation will be advantageous for adjusting the phases of transmitters but it may add to complexity of the tag's hardware and therefore affect the tag's reading range.

In addition to just extending the range, the system can perform localization of the tag. Since the phase of multiple transmitters is known as well as the RSSI value at the RFID reader, this information can be used to estimate the location of the tag.

Second Embodiment

The second embodiment includes a method for extending processing capabilities of tags by temporally separating sensing from communication with the RFID reader. The system is composed of one or more RFID readers and at least two transmitters. Sensing will be done when the tag is "charged" by the transmitters and sensed data will be saved. The data can be read using a standard RFID interface. The embodiment of this system, in comparison with the other RFID sensor-tag systems described herein, does not need to provide additional energy during communication with the RFID reader to perform sensing because sensing is done at a different time than communicating with the RFID reader. In one embodiment, standard RFID protocol can be used to read the sensed data while in another, a custom protocol is used that is optimized for reading large arrays of saved data. In one embodiment, the tag can be charged whenever the tag is in a bubble of energy while in another embodiment a transmitted and/or communicated via backscatter RSSI value can be used to direct energy towards the tag. The term "bubble of energy" as used within the context of this disclosure means a location where energy transmitted by the plurality of transmitters (e.g. 201, 202 and 203) is significantly greater than the energy surrounding the "bubble", due to the constructive effects of at least one of frequency, phase and polarity alignment of the energy beams emitted by the transmitters. The physical space where this constructive energy occurs can be similar to the shape of bubble, but need not be limited as such. Similarly, the term "bubble-walking" refers to moving the bubble of energy to different locations by modifying the beam steering (including modifying the phase and/or the polarity) of one or more of the transmitters.

Figure 5:
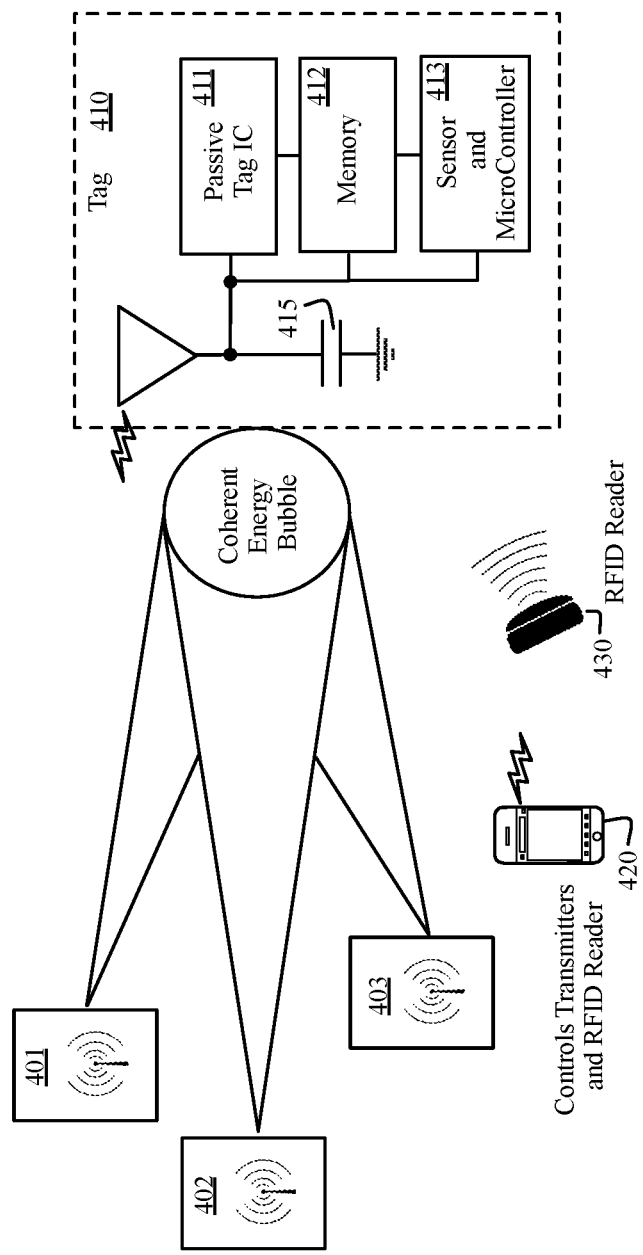
FIG. 5 is a schematic view of a second embodiment of a system with temporally separated RFID sensing and RFID communication.

FIG. 5 illustrates a system for improving processing capabilities of radio frequency identification (RFID) tags comprising an RFID reader (430) for initiating a query for an RFID tag, transmitters (401, 402 and 403) for charging the storage element 415 on the tag and initiating sensing, and an RFID sensor tag (410). If we look at the classification in FIG. 1 and FIG. 2, the transmitters (401-403) and the RFID reader are separated modules connected only through software (112 and 116), the transmitters only transmit a continuous wave to power the tag (121), and there is RSSI feedback from the RFID tags (132) from the receiver in one embodiment, and no feedback (131) in another embodiment. The transmitters operate at the same frequency as the RFID reader (161) or at a different frequency (162). For example, the transmitters transmit an energy beam to the tag on a frequency that is the same or different than a frequency used by the tag to communicate with the RFID reader. In the example shown in the FIG. 5 it is assumed that both the transmitter and the RFID reader operate in the same frequency range. The storage element can be minimal (171) because there is no need to store energy for a long time. In one embodiment, the tag sends an RSSI value when being energized by the transmitter (181), or in another embodiment the tag does not (183) send the RSSI value when being energized by the transmitter. Custom design of the tag is required (193).

Because the RFID reader (430) and transmitters (401, 402 and 403) operate in the same frequency range in this example, the software that runs on the computational unit 420 is responsible for time multiplexing. Since the reader and transmitters work in a time-multiplexed fashion, an off-the-shelf reader can be used.

This embodiment separates sensing and processing from RFID communication. The transmitters focus an energy bubble at one location for a period of time. After that period of time, the energy bubble is focused to a neighboring location in the space until the whole space is covered. Sensing and processing in the unit 413 is done when the tag is charged (415) by the transmitters (e.g. when the tag is in the energy bubble) and the sensed data will be saved in the tag's memory (412). After the transmitters have illuminated the overall space including all tags of interest, the RFID reader is turned on to read the sensed data. Sensor and microcontroller (413) on the tags will be turned off during RFID communication because there may not be enough energy for them to be turned on while communicating with the RFID reader. Therefore the range that can be achieved for reading is the range of a traditional passive tag, which is more than 10 m. Therefore, this embodiment does not extend, but rather preserves, the range of current RFID systems while adding extra processing capabilities in the tag. This cannot be done with traditional RFID sensor tags because they are designed such that a sensor needs energy from the RFID reader to perform sensing and therefore the reading range is low.

Figure 6:
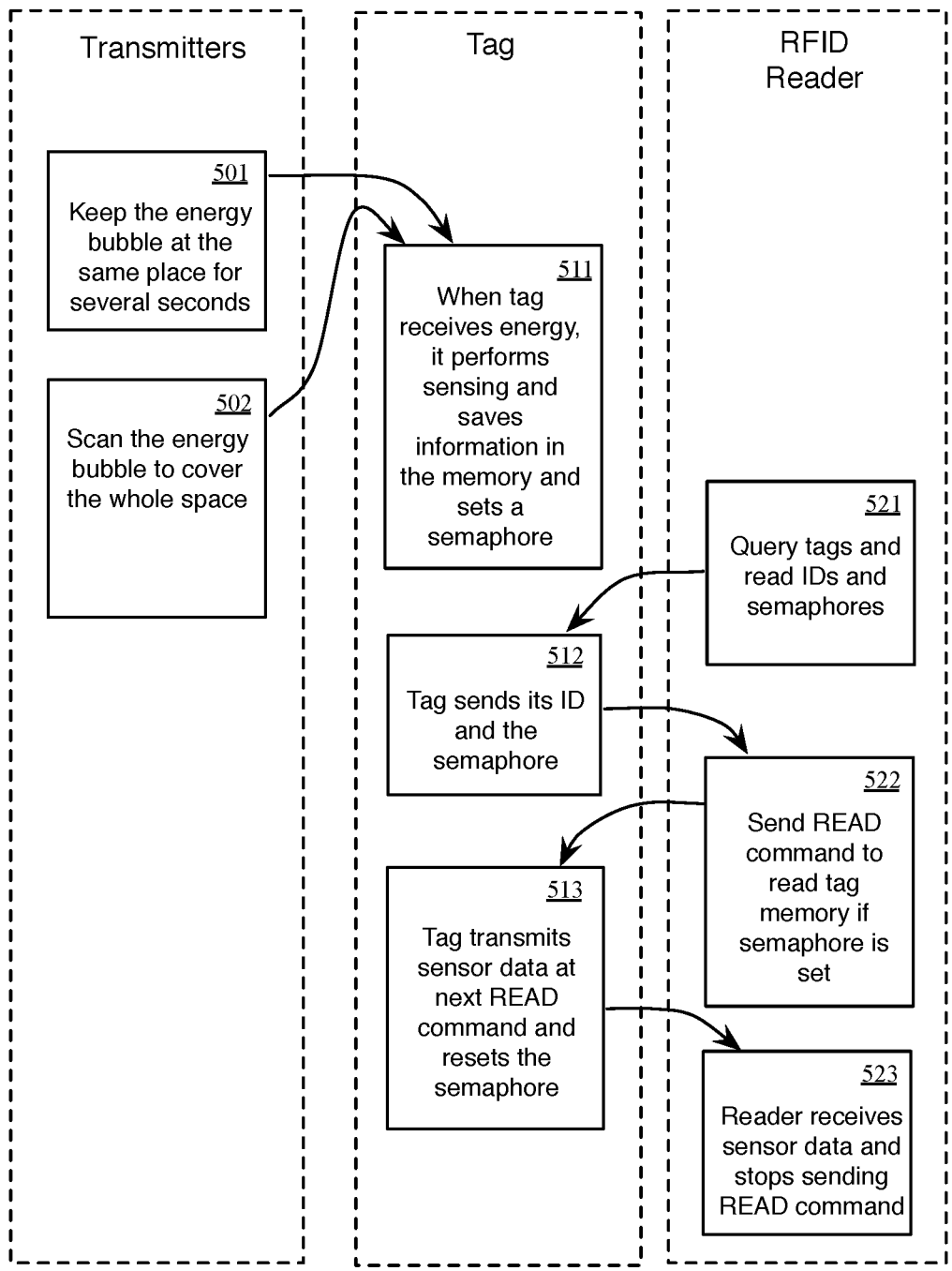
FIG. 6 is a flowchart representation of a method for operating the system shown in FIG. 5.

FIG. 6 illustrates an example of a protocol that corresponds to the system described in FIG. 5. FIG. 6 shows that the transmitters and RFID reader do not operate at the same time. The first step involves charging all electronic tags in the environment (501), or scanning the whole space (502), including the tags desired to be read. When the tag receives energy from the transmitter, it performs sensing, saves sensed information in the memory and updates a semaphore that indicates that a new value is written to tag's memory (511). When the RFID reader reads the tags, it queries the tags individually. After reading the tag's ID, the RFID reader sends one READ command to check the status of the semaphore in the memory (521). The tag sends the content of the memory location where the semaphore is saved (512). If the value of the semaphore is "1", the reader sends another READ command requesting the content of the memory location where the sensor data is saved to be sent (522). The tag reads the content of the memory location and sends the data (513). After that, the tag resets the value of the semaphore. The reader can then proceed with reading another tag (523). In another embodiment, the value of the semaphore is "0" or some other value to indicate that a subsequent READ command should be sent by the RFID reader. If the reader finds that the semaphore on a particular one of the tags is not set, such as might happen if the tag did not receive sufficient energy, higher level software (such as that running on the computational unit 420) can increase the duration during which the energy bubble is focused at the location of the particular tag.

In another embodiment, the transmitters and RFID reader will operate at different frequency ranges. Accordingly, time multiplexing will not be required. However, the tag will have at least two antennas and two corresponding RF units.

Third Embodiment

Figure 7:
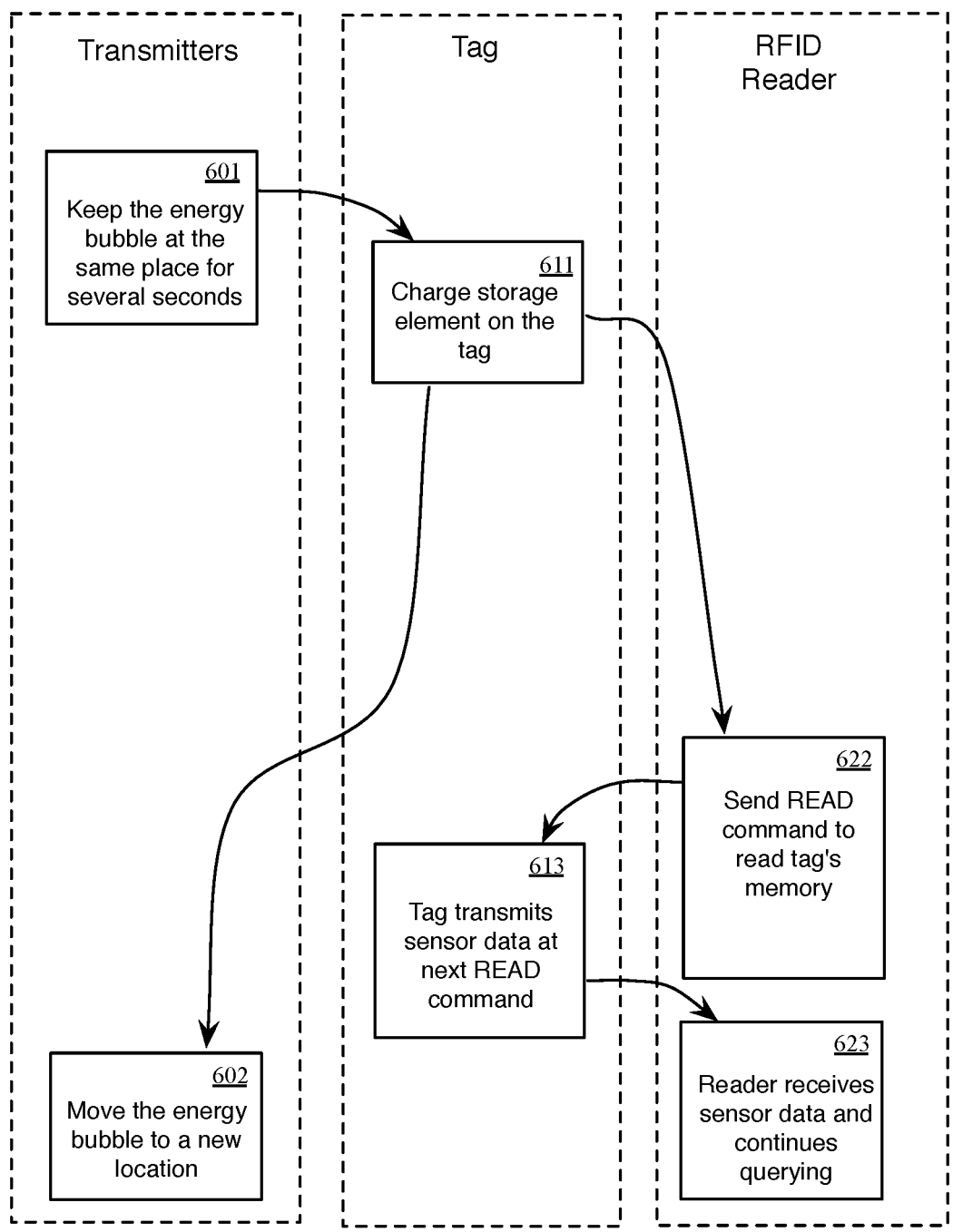
FIG. 7 is a flowchart representation of a bubble-walking method according to a third embodiment.

In a third embodiment, a tag is charged by the transmitters and then quickly read by the RFID reader. In this embodiment, a bubble of energy is focused on one place and then moved, followed by one RFID reading sequence. In one embodiment, the tag is a standard RFID tag. In another embodiment, the tag backscatters its RSSI value when illuminated by at least one of the transmitters. FIG. 7 illustrates a sequence for implementing the third embodiment.

Fourth Embodiment

A fourth embodiment uses bubble-walking of the energy transmitted by the transmitters. First, the space around one transmitter will be energized only by that transmitter. The areas further from the transmitter will benefit from constructive interference. The bubble of energy will be formed and kept at one location in space for a certain amount of time. In one embodiment this will be done without any calibration with respect to the location of the reference tags. In various embodiments, the position of the bubble of energy is estimated using one or more of a number of algorithms. In one embodiment, a location of the bubble is estimated based on the positions of the transmitters, known frequency and phases of transmission, and an assumption of the free-space propagation model. In another embodiment, the position of the bubble of energy is calibrated using reference tags. In various embodiments, reference tags are placed at known locations and provide RSSI values when illuminated by transmitters. After the position of the energy bubble is calibrated, the other positions can be estimated relative to the reference tags.

Figure 8:
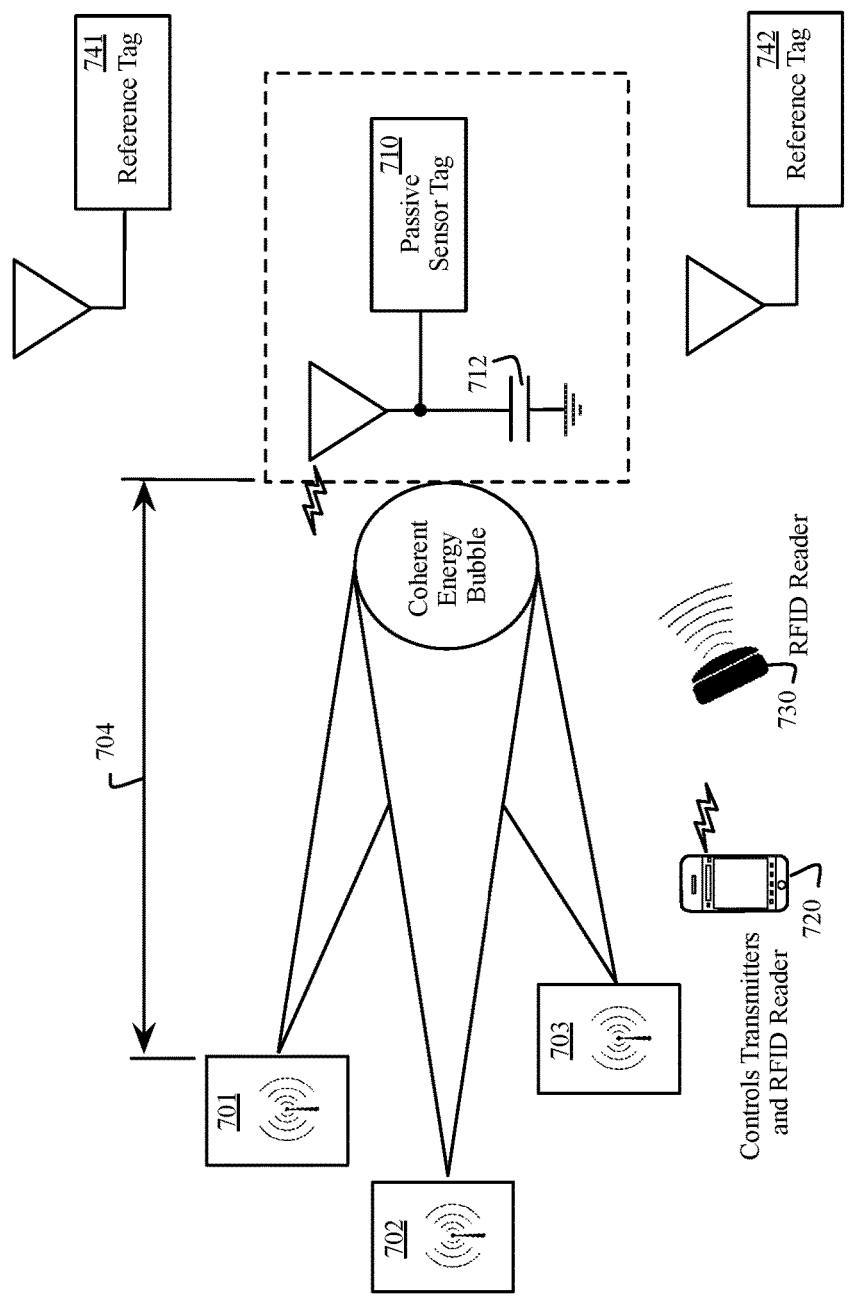
FIG. 8 is a schematic view of a fourth embodiment of a system with improved operating range using bubble-walking with RFID reference tags.

FIG. 8 illustrates a system for extending the range 704 of RFID sensor tags, wherein the system contains an RFID reader (730) for initiating a query for an RFID tag, at least one RFID tag (710) that communicates with the RFID reader and contains a storage element such as super capacitor (712), transmitters (701, 702 and 703) that can direct the energy towards the RFID tag and charge the super capacitor, and a controller (720) that controls a transmission of both the RFID reader and the transmitters. In addition in various embodiments, the system contains reference tags placed at strategic points to assist in directing energy to these specific points (741 and 742).

Referring to the classification of FIG. 1 and FIG. 2, the transmitters (701, 702 and 703) 703) and the RFID reader (730) are different hardware units connected only through software (112 and 116), the transmitters only transmit a continuous wave to power the tag (121) and there is no feedback from the RFID tags (131). However, if reference tags are used then they will provide RSSI to the transmitters (133). In various embodiments, the transmitters operate at the same frequency as the RFID reader (161) or at a different frequency (162), in contrast with the example shown in FIG. 7 where it is assumed that both systems operate in the same frequency range. The storage element at the tag needs to be large (173). The tag does not send RSSI when being illuminated by a transmitter (183). Custom design of the tag is required because a large storage element is needed (190).

Figure 9:
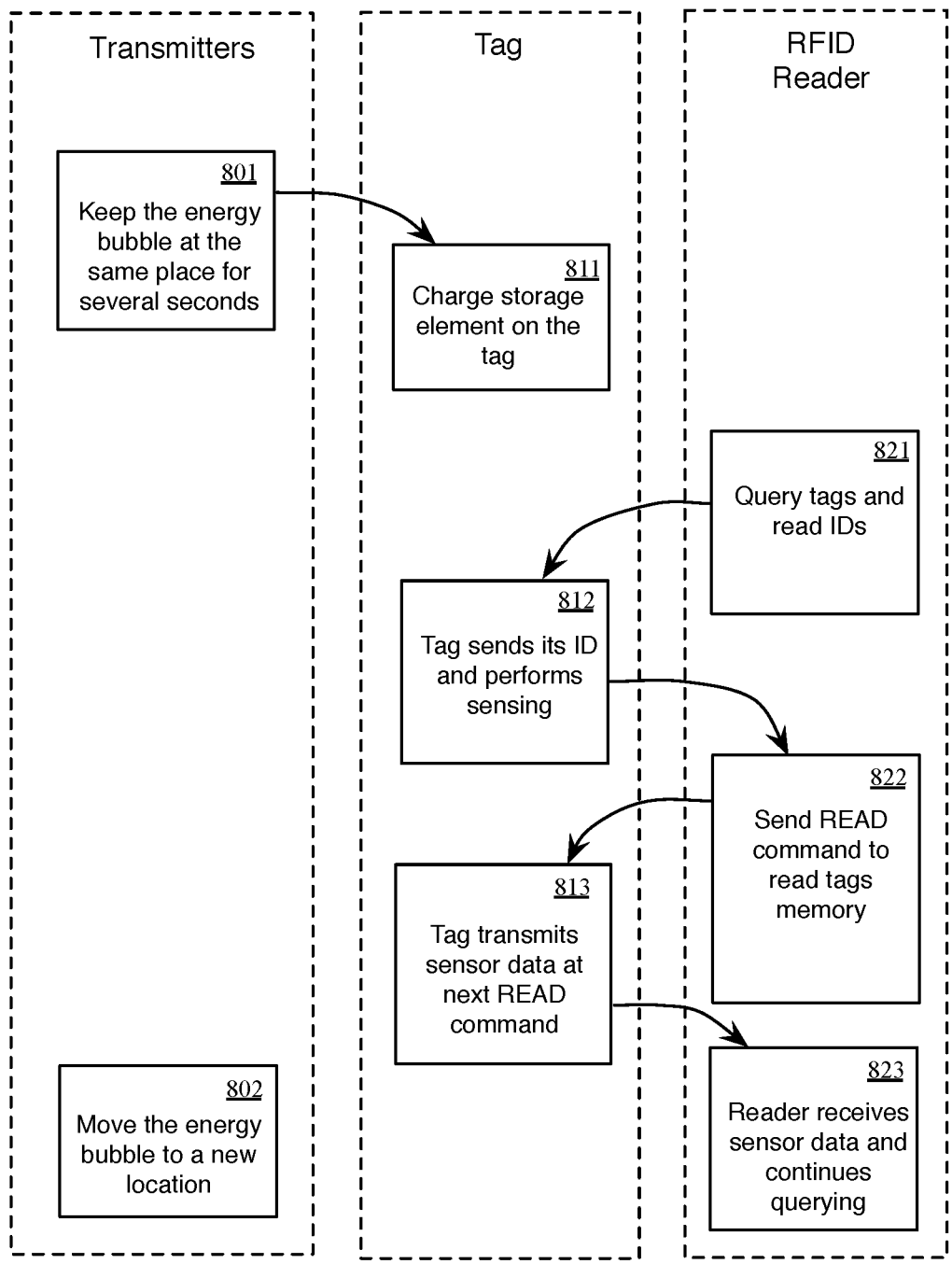
FIG. 9 is a flowchart representation of a method for operating the system shown in FIG. 8.

FIG. 9 illustrates a protocol for reading RFID sensor tags. The transmitters focus the energy to a specific place for several seconds (801). If a tag happens to be in that place, its storage element will be charged (811). After that, the transmitters are turned off and the RFID reader is turned on. The RFID reader queries the tags in its reading range (821). If the storage element of the tag is charged, the tag can act as a semi-passive tag and achieves a large reading range. The reader will read the tag's ID. If the tag is a sensor tag, the tag will perform sensing (812) and then the sensed data will be read by the reader (steps 822 and 813). Subsequently, the reader continues querying other tags (823). After no other tags respond, the transmitters are turned on again but now they focus energy on a different place 802 for several seconds and the overall procedure is repeated.

In one embodiment, the reference tags placed at known location are used. These tags are capable of detecting RSSI and communicating an RSSI value to the transmitters. In this case, they can be used to focus the energy bubble. In further embodiments, the passive sensor tags 710 are located in or on an object that is, at least approximately, in a known position with respect to the reference tags. For example, the passive sensor tags are in a car on an assembly line, and the reference tags are located at a particular position in the assembly line where the passive sensor tags are to be read. This enables the energy bubble to be focused on particular locations on or within the object without, for example, a need to receive an RSSI from the passive sensor tags.

In another embodiment, the transmitters and RFID reader are integrated in one system. In this case, off-the-shelf passive tags can be used. The transmitters will focus a bubble of energy at one spot for some time and then one of the transmitters will act as a reader. The RFID reader will read the tags that are in the bubble of energy and therefore this embodiment will be able to achieve a longer range.

Figure 10:
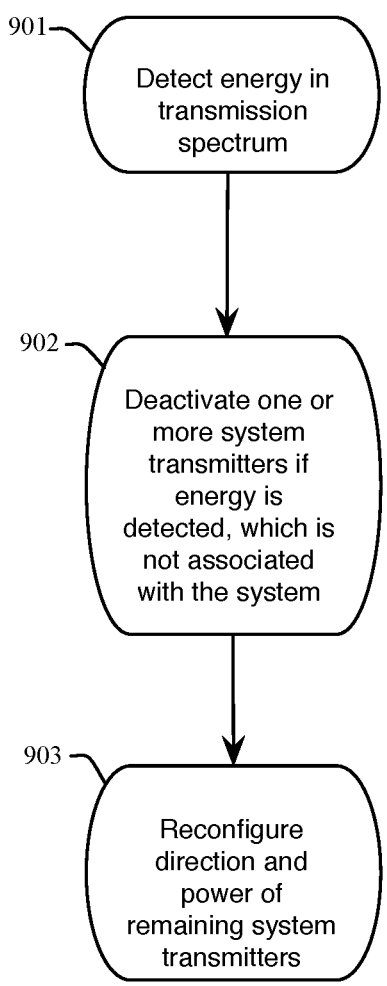
FIG. 10 is a flowchart representation of a method for integrating the embodiments of this disclosure with existing wireless infrastructure while minimizing frequency interference.

FIG. 10 illustrates a method of an embodiment where an RFID system is designed to coexist with off-the-shelf RFID readers and other wireless devices that operate in the same frequency band. If some energy is detected (e.g. by the controller) in the frequency band, the transmitters will not transmit. In this way, the transmitters can be added to the off-the-shelf RFID deployments and work with them in time-multiplexed fashion.

Figure 11:
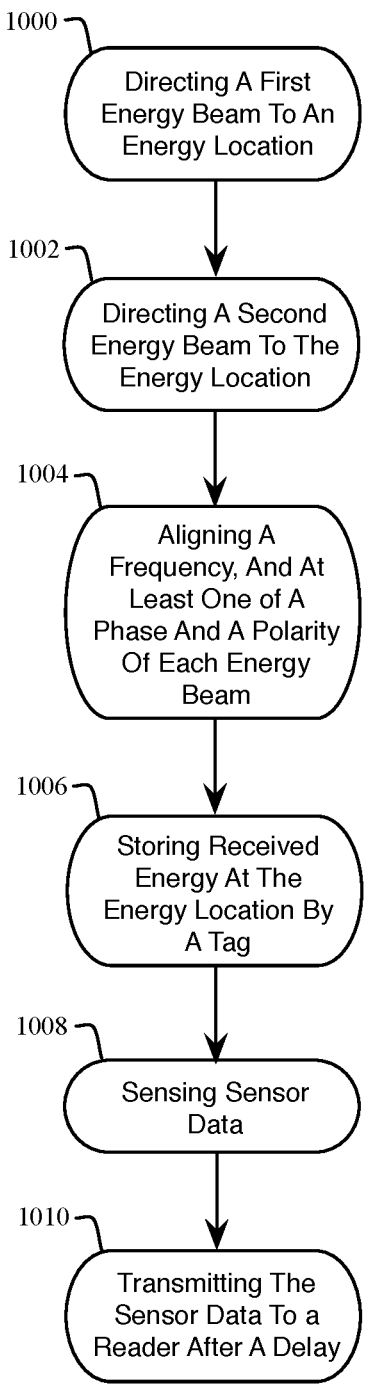
FIG. 11 is a flowchart representation of a method for charging long-range radio frequency identification tags in accordance with an embodiment of the present disclosure.

FIG. 11 illustrates a method for charging long-range RFID tags. At 1000, a first energy beam is directed to an energy location. At 1002, a second energy beam is directed to the energy location. It other embodiments, more than two energy beams are used, wherein each energy beam is directed to the energy location. The term "energy location" as used herein, refers to a location with greater energy density than a surrounding area, due to the constructive interference of the first and second energy beams.

At 1004, a frequency and at least one of a phase and a polarity of each energy beam are aligned. In one example, a frequency of the first energy beam is aligned to a frequency of the second energy beam, and the phases of the first energy beam and the second energy beam are aligned. The term "alignment" refers to aligning at the energy location. "Aligning" a frequency of two respective beams means to make the frequency of the two beams the same. "Aligning" a phase of two respective beams means to make the phase of the two beams the same. "Aligning" a polarity of two respective beams means to make the polarity of the two beams the same. At 1006, the tag stores the energy received at the energy location (e.g. by charging a capacitor). At 1008, the tag senses the sensor data. At 1010, the sensor data is transmitted to a reader after a delay.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for charging long-range radio frequency identification tags comprising:
   a first transmitter configured to direct a first energy beam to an energy location;
   a second transmitter configured to direct a second energy beam to the energy location, the second transmitter physically separate from the first transmitter;
   a tag at the energy location, the tag configured to store a received energy from the energy location, to sense a sensor data, and to transmit the sensor data to a reader after a period from when the tag is at the energy location;
   a controller configured to align at the energy location, a first frequency of the first energy beam with a second frequency of the second energy beam, and at least one of a first phase, and a first polarity of the first energy beam with a respective second phase, and a respective second polarity of the second energy beam to maximize an energy level at the energy location in response to a device response of the tag; and
   wherein the tag further comprises a capacitor configured to be charged to an operating voltage level in response to the tag receiving the received energy, wherein the period equals a charging time to charge the capacitor to the operating voltage level measured by a voltage monitor connected to the capacitor,
   wherein the tag is configured to transmit a default content of a memory of the tag, while the capacitor is not charged to the operating voltage level, and the tag is configured to sense and transmit the sensor data after the capacitor is charged to the operating voltage level, and
   wherein the default content of the memory includes one or more of a cleared data value representing a cleared condition of the memory, a first semaphore representing an uncharged status of the capacitor, a second semaphore representing whether the sensor data has been sensed since last transmitted, a timestamp value representing a time when the memory was cleared, and a received signal strength indicator representing a signal strength of the received energy.

2. The system of claim 1 wherein the reader is integrated with the first transmitter to direct the first energy beam and receive the sensor data with an antenna of the first transmitter.

3. The system of claim 1 wherein the reader is integrated with the first transmitter to direct the first energy beam and receive the sensor data with a first antenna of the first transmitter, and a second reader is integrated with the second transmitter to direct the second energy beam and receive the sensor data with a second antenna of the second transmitter.

4. The system of claim 1 wherein the device response is one of a received signal strength indicator and a magnitude of the received energy at the tag communicated from the tag using backscatter.

5. The system of claim 1 wherein the tag is configured to sense the sensor data, save the sensor data in a memory of the tag and set a semaphore after saving the sensor data, in response to the tag receiving the received energy, and to transmit the sensor data to the reader only if the semaphore is set and queried by the reader, wherein the period equals a sensing time for the tag to set the semaphore after the tag is at the energy location.

6. The system of claim 1 wherein the period is a fixed duration of time.

7. The system of claim 1 wherein the energy location is moved to a new energy location after the period, and the energy location is determined, at least in part, from a plurality of reference tags, each reference tag transmitting a respective received signal strength indicator corresponding to a signal strength of the received energy at the respective reference tag.

8. The system of claim 1 wherein the controller is configured to deactivate at least one of the first transmitter and the second transmitter in response to the controller detecting a background energy having a same frequency as the respective first transmitter or second transmitter.

9. A method for charging long-range radio frequency identification tags comprising:
   directing by a first transmitter, a first energy beam to an energy location;
   directing by a second transmitter physically separate from the first transmitter, a second energy beam to the energy location;
   storing by a tag at the energy location, a received energy from the energy location;
   sensing with the stored received energy, a sensor data;
   transmitting with the stored received energy, the sensor data from the tag to a reader, after a period from when the tag is at the energy location;
   aligning at the energy location by a controller, a first frequency of the first energy beam with a second frequency of the second energy beam, and at least one of a first phase and a first polarity of the first energy beam with a respective second phase and a respective second polarity of the second energy beam to maximize an energy level at the energy location in response to a device response of the tag; and
   further comprising charging a capacitor of the tag to an operating voltage level in response to the tag receiving the received energy, wherein the period equals a charging time to charge the capacitor to the operating voltage level measured by a voltage monitor connected to the capacitor,
   further comprising transmitting by the tag, a default content of a memory of the tag, while the capacitor is not charged to the operating voltage level, and sensing and transmitting by the tag, the sensor data after the capacitor is charged to the operating voltage level, and
   wherein the default content of the memory includes one or more of a cleared data value representing a cleared condition of the memory, a first semaphore representing an uncharged status of the capacitor, a second semaphore representing whether the sensor data has been sensed since last transmitted, a timestamp value representing a time when the memory was cleared, and a received signal strength indicator representing a signal strength of the received energy.

10. The method of claim 9 wherein the device response of the tag is determined from a received signal strength indicator (RSSI), the RSSI being a measured value of the received energy at the tag.

11. The method of claim 9 wherein the tag communicates the device response using backscatter, and the device response is based on a magnitude of the received energy at the tag.

12. The method of claim 9 wherein the storing further comprises charging a capacitor connected to the tag to store the received energy, and further comprising:
   measuring an operating voltage level on the capacitor to determine an amount of received energy, wherein the tag transmits a default content of a memory of the tag, while the capacitor is not charged to the operating voltage level, and the tag senses and transmits the sensor data after the capacitor is charged to the operating voltage level.

13. The method of claim 9 further comprising:

saving the sensor data after sensing the sensor data, setting a semaphore in response to saving the sensor data, and transmitting the saved sensor data, only in response to a query by the reader when the semaphore is set.

14. The method of claim 9 further comprising determining the energy location from a plurality of reference tags transmitting a respective received signal strength indicator corresponding to a signal strength of the received energy at the respective reference tag.

15. The method of claim 9 further comprising deactivating at least one of the first transmitter and the second transmitter in response to the controller detecting a background energy having a same frequency as the respective first transmitter or second transmitter.

16. A system for charging long-range radio frequency identification tags comprising:

a plurality of physically separated transmitters, each transmitter configured to direct a respective energy beam to an energy location;

a tag at the energy location, the tag configured to store a received energy from the energy location, to sense a sensor data and to transmit the sensor data to a reader after a capacitor connected to the tag charges to an operating voltage level, the capacitor charged by the received energy;

a controller configured to align at the energy location for each of the plurality of transmitters, a respective frequency, and at least one of a respective phase, and a respective polarity of each respective energy beam to maximize an energy level at the energy location in response to a device response of the tag; and wherein the tag is configured to transmit a default content of a memory of the tag, while the capacitor is not charged to the operating voltage level, and the tag is configured to sense and transmit the sensor data after the capacitor is charged to the operating voltage level, and wherein the default content of the memory includes one or more of a cleared data value representing a cleared condition of the memory, a first semaphore representing an uncharged status of the capacitor, a second semaphore representing whether the sensor data has been sensed since last transmitted, a timestamp value representing a time when the memory was cleared, and a received signal strength indicator representing a signal strength of the received energy.

17. The system of claim 16 wherein the device response is one of a received signal strength indicator and a magnitude of the received energy at the tag communicated from the tag using backscatter.

* * * * *